O. B. FRAZIER.
LAWN MOWER.
APPLICATION FILED JAN. 10, 1916.

1,252,421.

Patented Jan. 8, 1918.

WITNESSES:
C. C. Horner
J. H. Wells.

INVENTOR
OLIVER B. FRAZIER

BY
Lockwood Lockwood
ATTORNEYS

UNITED STATES PATENT OFFICE.

OLIVER B. FRAZIER, OF ELWOOD, INDIANA.

LAWN-MOWER.

1,252,421.                    Specification of Letters Patent.           Patented Jan. 8, 1918.

Application filed January 10, 1916.   Serial No. 71,309.

*To all whom it may concern:*

Be it known that I, OLIVER B. FRAZIER, a citizen of the United States, and a resident of Elwood, county of Madison, and State of Indiana, have invented a certain new and useful Lawn-Mower; and I do hereby declare that the following is a full, clear, and exact description thereof, reference being had to the accompanying drawings, in which like letters refer to like parts.

The object of this invention is to provide a means for yieldingly adjusting the cutter bar of a lawn mower to the cutting reel so that when adjusted to the cutting reel, it may be yieldingly held to the reel in the proper cutting position. This is accomplished by means of pivotal arms secured at both ends of the cutter bar and adjusted by means of set screws operating on one side of said arms and by yielding means or springs pressing against the other side thereof. This enables an easy and perfect adjustment of the cutter without the necessity of using a screw driver or other tool and renders the adjustment easily accessible. The advantage of this construction is that it obviates an upper cross bar which, in wet grass, catches and clogs the machine. Another feature of the invention is in having the adjustable arms secured on each end of the cutter bar which enables the ends of the cutter to be differently adjusted according to their wear.

The full nature of the invention will be understood from the accompanying drawings and the following description and claim:—

Figure 1:
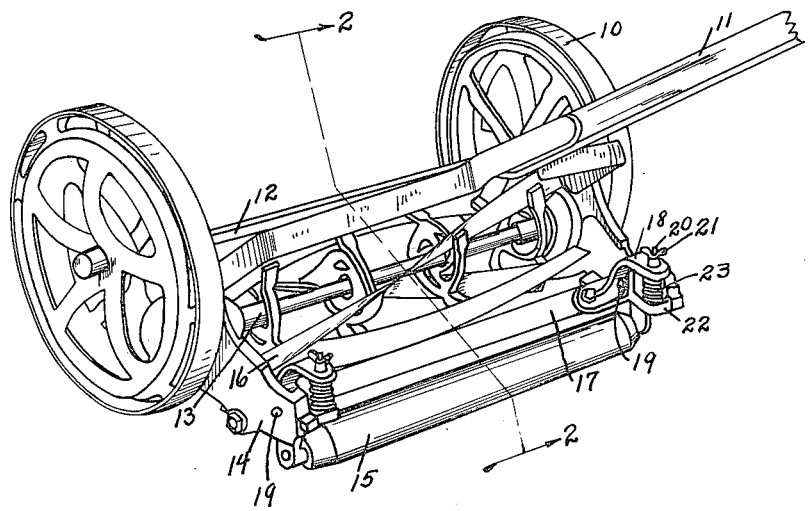
Figure 2:
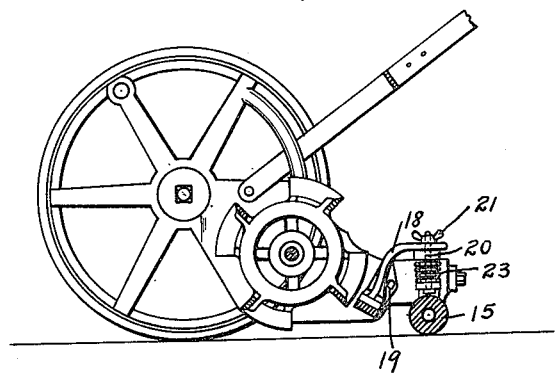

In the drawings, Figure 1 is a perspective view of a lawn mower with this improvement. Fig. 2 is a cross section on the line 2—2 of Fig. 1.

In the drawings there is shown a lawn mower having wheels 10, a handle 11, a cross rod 12 and cutting reel 13. The construction of the lawn mower herein described is of the ordinary type in common use. It is, therefore deemed unnecessary to go into the specific construction of the parts thereof.

Extending rearwardly from the axle there are frames 14 having a roller 15 extending between their ends so that said frames ride on the wheels 10 and the roller 15. The cutting reel 13, having blades 16, rides on bearings in said frames substantially half way between the axle and the roller, said cutting reel being actuated by the wheels 10 in the usual manner.

There is a cutter bar 17 secured at each end to the arms 18 which are fulcrumed at the point 19 to the frames 14. Said arms are substantially L-shaped extend upwardly and rearwardly from the cutter bar which lies adjacent the cutting reel. Extending upwardly from flanges 22 on the frames 14 are bolts 20, which bolts extend through openings in the outer ends of the arms 18, the upper ends of said bolts being threaded to receive wing nuts 21 by means of which the outer ends of the arms 18 may be forced downwardly and the cutter bar 17 moved toward the cutting reel. Surrounding said bolts between the arms 18 and the flanges 22 there are spiral springs 23 which have a tendency to force said arms upwardly against the wing nuts and hold the cutter bar away from the cutting reel.

Therefore, it will be seen that by using an arm extending from each end of the cutter bar having a spring forcing the arm in one direction so as to loosen the cutter and a wing nut acting on the arm in the opposite direction for tightening the cutter and holding it to the cutting reel, either end of the cutter may be readily and perfectly adjusted thereto.

The invention claimed is:

A lawn mower including a cutting reel, end frames, a cutter bar, an arm at each end of said cutter bar and attached thereto and extending upwardly and rearwardly therefrom, means to pivot said arms to said frames, a flange on each frame, a bolt extending from each flange and through the rear ends of said arms adapted to force said arms downwardly and adjust said bar to the blades of said reel, and spiral springs surrounding said bolts between said arms and flanges for exerting an upward pressure thereon and retaining said bar spaced from the axis of said reel.

In witness whereof, I have hereunto affixed my signature in the presence of the witnesses herein named.

OLIVER B. FRAZIER.

Witnesses:
E. C. HECK,
CHAS. HOLTSCLAW.